May 19, 1964  R. E. LE CRONIER ETAL  3,134,052
VOLTAGE LEVEL DETECTOR
Filed April 18, 1962                           2 Sheets-Sheet 1

INVENTORS R. E. LE CRONIER
M. I. RACKMAN
BY
S E Hollander
ATTORNEY

May 19, 1964  R. E. LE CRONIER ETAL  3,134,052
VOLTAGE LEVEL DETECTOR
Filed April 18, 1962  2 Sheets-Sheet 2

INVENTORS R. E. LE CRONIER
M. I. RACKMAN
BY S E Hollander
ATTORNEY

United States Patent Office 3,134,052
Patented May 19, 1964

3,134,052
VOLTAGE LEVEL DETECTOR
Richard E. Le Cronier, Sea Bright, N.J., and Michael I. Rackman, Brooklyn, N.Y., assignors to Bell Telephone Laboratories, Incorporated, New York, N.Y., a corporation of New York
Filed Apr. 18, 1962, Ser. No. 188,492
6 Claims. (Cl. 317—123)

This invention relates to voltage level detectors and more particularly to voltage level detectors employing ferreed devices.

In modern technology it is often necessary to energize a particular one of a plurality of devices responsive to a respective one of a plurality of input voltages. Such a need arises, for example, in multilevel data transmission systems where the transmitted pulses may have any one of a plurality of voltage levels. The particular level must be determined by the receiver equipment, and often a particular relay or similar device must be energized responsive thereto.

The pulses are often of microsecond durations, and the circuits operated therefrom must be compatible with these short duration inputs. Relays require operating times in the order of milliseconds and consequently, if they are used in a voltage level detector circuit, buffer circuits interposed between the input source and the detector stages are often required.

Another disadvantage of voltage level detectors employing relays is that often some of the relay contacts are required for governing the operation of the detector circuit itself. The particular relay or stage operated generally controls external circuits and often numerous contacts are required to perform this function. Prior circuits, however, have often necessitated the utilization of some of the relay contacts for controlling the operation of the detector circuit itself and, consequently, fewer contacts remain for incorporation in the external circuits.

Examples of this inefficient contact apportionment can be found in those types of voltage level detectors wherein the input voltage may be at any one of $n$ levels. Each level operates a respective one of $n$ relays. Biasing circuits may be easily provided for enabling the $j$th level to energize the first $j$ relays only. However, the $j$th level should only operate the $j$th relay, and consequently, at least one set of contacts on the $j$th level is often required to release the first $j-1$ relays.

The ferreed is a switching device having an operating time in the order of milliseconds, but being responsive to pulses of microsecond durations. The basic parallel and series ferreed structures themselves are disclosed in the January 1960 issue of the Bell System Technical Journal, pages 1–30. Such devices, being responsive to short duration control signals, are ideally suited for use in a voltage level detector which must respond to short duration input pulses. However, conventional ferreeds generally have only one or two sets of contacts, and thus if they are utilized in a voltage level detector it is desirable that none of these contacts be assigned the function of releasing other ferreeds or in any other way governing the operation of the voltage level detector itself.

It is an object of this invention to provide improved voltage level detectors.

It is another object of this invention to provide voltage level detectors responsive to pulses of microsecond durations.

It is another object of this invention to provide voltage level detectors wherein contacts of the operated stage in any detector need not be utilized for releasing other stages or for controlling the operation of the voltage level detector itself in any manner whatsoever.

In the copending application Serial No. 156,799, filed December 4, 1961, of R. E. LeCronier and E. E. Schwenzfeger, voltage level detectors utilizing ferreeds having differential excitation in combination with Zener diodes and/or PNPN diodes are disclosed. The present invention is an improved voltage level detector wherein are incorporated ferreeds having only two coils which do not require differential excitation.

It is still another object of this invention to provide improved voltage level detectors employing ferreeds utilizing but two coils and a reduced number of circuit components.

Although in our copending application Serial No. 156,800, filed December 4, 1961, voltage level detectors employing ferreeds utilizing but two coils are also disclosed, these ferreeds are all in parallel with each other. The input voltage is applied to each ferreed stage in a similar manner and a combination of biasing means and a unique winding arrangement enables only the appropriate ferreed to operate responsive to a respective input voltage level. It has been found that ferreeds operated in parallel present more stringent design requirements than serially operated ferreeds; that is, less allowance must be made for individual ferreed characteristics if a plurality of them are operated in series rather than in parallel.

It is, therefore, still another object of this invention to provide improved voltage level detectors employing two-winding ferreeds in serial rather than parallel configurations.

The above objects of the present invention are achieved in an illustrative embodiment in which each ferreed is provided with two windings, each wound around one of two sections of remanent magnetic material. If both windings are pulsed in such a manner that the two fluxes set in the device aid each other, the reed switches assume a first state. On the other hand, if one of these windings is pulsed in the opposite direction, the reed switches assume a second state.

Briefly, in accordance with the principles of the invention, the two windings of each ferreed are serially connected to one another. The windings of each ferreed are furthermore in series with the windings of all other ferreeds. A plurality of different breakdown voltage PNPN diodes shunt the various ferreed windings, each diode being connected in parallel with two series windings, each one of which windings is on a different ferreed. Initially, all windings are pulsed in such a manner that the two fluxes in each ferreed assume a first state. All the reed contacts are thus open. The $j$th input voltage level causes only the first $j$ diodes to break down. Current thus flows through both windings of all ferreeds above the $j$th as the diodes connected to these stages do not conduct. No current flows through stages below the $j$th as the diodes connected to these stages are in the breakdown condition and shunt current from the windings. The $j$th diode shunts current from only one winding of the $j$th ferreed, and this ferreed, the only one having one and only one winding pulsed, operates.

It is a feature of this invention to provide a plurality of ferreeds each having two windings, with the windings of each ferreed being connected in series with each other and in series with the windings of all other ferreeds.

It is another feature of this invention to provide means for reversing the flux in only one winding of only one ferreed responsive to each input voltage level.

It is another feature of this invention that for any particular input voltage level the ferreed associated with that level has a flux reversal caused by current flowing in one winding only of that ferreed, thereby effecting a closure of the contacts of that ferreed, while for ferreeds associated with higher voltage levels flux reversals are caused by currents flowing in both windings, thereby reversing the state of remanence of the magnetic material of both flux paths of the upper level ferreeds without changing the state of the contacts of those upper voltage level ferreeds, and for ferreeds associated with lower voltage levels, current is shunted from both windings, thereby preventing the reversal of the magnetic state of both flux paths of the lower level ferreeds.

It is still another feature of the invention that the states of magnetization of the remanent elements of the ferreeds be reset prior to the application of each voltage signal whose level is to be detected.

Further objects, features and advantages of the invention will become apparent upon consideration of the following description in conjunction with the drawing, wherein.

Figure 1A:
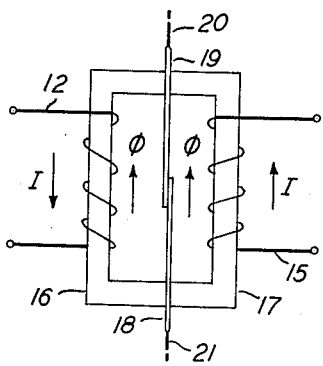
FIG. 1A shows a parallel type ferreed structure which is employed in one embodiment of the invention.

Referring to FIG. 1A, the parallel ferreed structure comprises two branches of remanent magnetic material 16 and 17. Each of these legs is connected to both soft magnetic reeds 18 and 19. In the normal position these reeds are open. When the ferreed is energized the reeds close and connect conductors 20 and 21 to one another, as shown. The soft magnetic reeds 18 and 19 are also electrical conductors so that when they close, an external circuit connected to conductors 20 and 21 is completed.

The remanent flux in each of the two legs 16 and 17 has the same magnitude. In the open position, the two fluxes aid each other. If the flux in leg 16 is in the upward direction, the flux in leg 17 is in the downward direction. Consequently, all flux is within the outer perimeter of the structure. No flux passes through the reeds 18 and 19, and they remain in their normal open position. Similarly, if the total flux in the circuit is in a counterclockwise direction, the reeds remain open.

The reeds close, however, when both fluxes are in an upward or both are in a downward direction. If the flux in leg 16 as well as the flux in leg 17 is in an upward direction, as shown, the return path for both fluxes is through the two reeds. When the flux passes through these reeds they attract each other in order to reduce the air gap between them. Thus, once both fluxes are set in the upward direction, the reeds close and remain closed. In a similar manner, if both fluxes are set in the downward direction, both reeds close.

The fluxes in the two legs are switched by current pulses applied to conductors 12 and 15. A current I is required to set the flux in each leg. If the two current pulses have the directions shown, the flux set in each of the legs is in an upward direction as shown and the reeds close. If either winding alone is thereafter pulsed in the opposite direction, the flux in the associated leg reverses direction, and consequently, the two fluxes aid each other and the reeds open.

The remanent fluxes are set by the application of microsecond pulses. Although the reeds require a time duration in the order of milliseconds to close, their closure is determined by the fluxes set by the microsecond pulses. Consequently, the ferreed can be operated by short duration input pulses and is ideally suited for use in a voltage level detector.

Figure 1B:
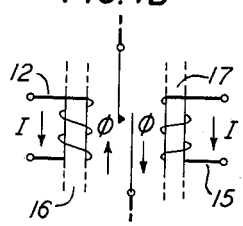
FIGS. 1B and 1C show various combinations of current and flux directions within the ferreed circuit of FIG. 1A.
Figure 1C:
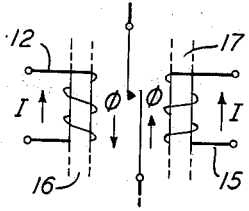

In FIGS. 1B and 1C, the arrows indicate two other combinations of directions of the applied current pulses and the respective fluxes set within the windings and in the legs 16 and 17. In FIG. 1B both windings have been energized by current pulses having the directions shown.

Both fluxes aid each other, and the ferreed shown symbolically in FIG. 1B is therefore not operated with the reeds 18 and 19 (shown in conventional "contact" form) open.

In FIG. 1C conductor 15 is energized with a current having the direction shown in FIG. 1A. The flux is consequently in an upward direction in leg 17. However, conductor 12 is energized with a current pulse having a direction opposite to that shown in FIG. 1A, and consequently the flux in leg 16 is in a downward direction. The ferreed disclosed symbolically in FIG. 1C is therefore not operated as the two fluxes aid each other. The reeds are therefore open.

Figure 2A:
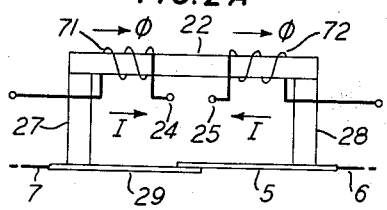
FIG. 2A shows a series type ferreed structure which is employed in a second embodiment of the invention.

Referring to FIG. 2A, the series ferreed structure comprises a bar 22 of remanent magnetic material, two sections 27 and 28 of soft magnetic material and two soft magnetic reeds 5 and 29. The reeds are also electrical conductors and when closed complete an electrical circuit between conductors 6 and 7. Bar 22 may assume various configurations, including that of a cylinder encompassing the reeds.

Current applied to coil 71 sets a remanent flux in that portion of the bar 22 about which it is wound, whose direction depends upon the direction of the current in the coil. Similar remarks apply to coil 72. When the two current pulses have the directions shown, the magnetomotive forces applied to bar 22 aid each other, and the total flux in bar 22 is as shown, with opposite magnetic poles being established across the reeds. A flux is set in the clockwise direction and passes through reeds 5 and 29 which thus close. Once the remanent flux is set in bar 22 by the application of microsecond pulses, reeds 5 and 29 close, the actual closing of the reeds requiring a time duration in the order of milliseconds, and remain closed until current pulses are provided for releasing the contacts. Similarly, if both current pulses have directions opposite to those shown, the total flux in the device is in the counterclockwise direction and the reeds close.

Figure 2B:
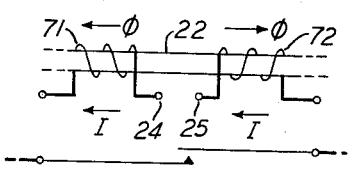
FIGS. 2B and 2C show various combinations of current and flux directions within the ferreed circuit of FIG. 2A.

If either one of the two current pulses has a direction opposite to that shown in FIG. 2A, the reeds do not close. If the current in coil 71 is from right to left, the flux set is similarly from right to left. The two fluxes thus are in opposite directions, the poles across the reeds are the same, and there is accordingly no flux at the junction of the reeds to attract them together. The flux set by the current in coil 72 is from left to right in the right-hand part of bar 22. The return path for this flux is primarily through the upper portion of bar 28 and through the air. Similarly, the flux in the left part of bar 22 has a main return path through the upper part of bar 27 and the air. This condition is shown symbolically in FIG. 2B, the contacts being open.

Figure 2C:
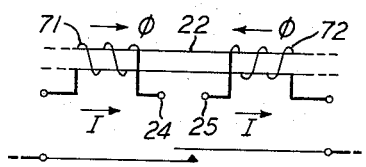

If it is the current in coil 72 which has a direction opposite to that shown in FIG. 2A, the two flux directions are as shown in FIG. 2C. Again, the fluxes oppose each other and define similar magnetic poles at the ends of the bar 22 and thus across the reeds. As a result, two separate flux paths exist, each path comprising mainly a section of bar 72, a section of one of bars 27 or 28, and an air path. As shown in FIG. 2C, the reeds are open. In the parallel ferreed when the two fluxes aid each other no flux passes through the reeds and they remain open. In the series ferreed when the two fluxes aid each other, flux passes through the reeds and they remain closed.

Figure 3:
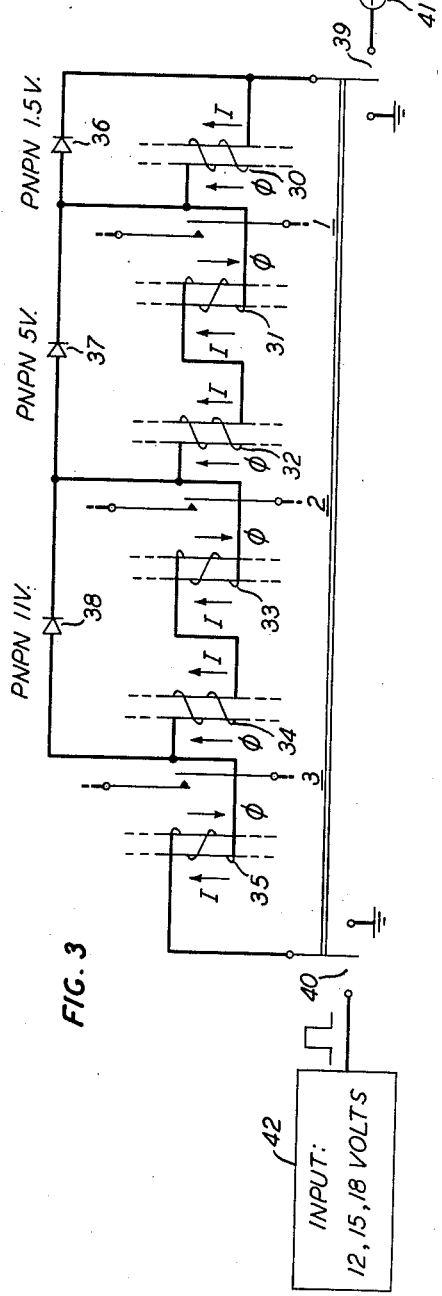
FIGS. 3 and 4 disclose two embodiments of the invention.

The embodiment of FIG. 3 utilizes the parallel ferreed of FIG. 1A, the ferreed devices being shown symbolically as in FIGS. 1B and 1C. When the applied currents (and fluxes) have the directions shown in FIG. 1A, the reeds close. If the applied currents (and fluxes) have the directions of FIGS. 1B or 1C, the ferreeds remain unoperated.

The voltage level detector shown in FIG. 3 comprises three stages. The input 42 applies microsecond pulses whose magnitudes are 12, 15 or 18 volts to the detector. Only stage 1 is to operate whenever the 12 volt input is applied. Only stages 2 and 3 are to operate when respective inputs of 15 and 18 volts are applied.

The two windings of each ferreed are in series with each other as well as in series with the windings of the other two ferreeds. A PNPN diode having a breakdown voltage of 1.5 volts shunts winding 30 of the first ferreed. A 5 volt PNPN diode shunts winding 31 of the first ferreed and winding 32 of the second, while the 11 volt PNPN diode 38 shunts windings 33 of the second ferreed and 34 of the third. These PNPN diodes do not conduct in the reverse directions. A PNPN diode, however, does conduct in the forward direction when the potential across it exceeds the breakdown voltage. When the breakdown voltage is exceeded, the diode presents an effective short circuit with the voltage across it dropping to a negligible value.

Prior to the application of an input voltage the detector is reset by moving contacts 39 and 40 to the right. Although the resetting operation is shown symbolically as electromechanical it is apparent that electronic means may be incorporated to achieve the same result. When the circuit is reset current flows from source 41 through the six ferreed windings to ground, contact 39 being connected to source 41 and contact 40 being connected to ground. The current through each winding and the flux set in each winding have directions as shown by the arrows in FIG. 3. Each ferreed is in a state as shown in FIG. 1C, all three being unoperated.

Before the input voltage is applied, contacts 39 and 40 are moved to the left, contact 40 now being connected to input source 42 and contact 39 being connected to ground. If a 12 volt input is now applied, 2 volts initially appear across each of the six windings. As a result, diode 36 breaks down, its breakdown voltage being exceeded by .5 volt. The voltage across winding 30 thus drops to zero as diode 36 presents a short circuit. The 12 volt input thus appears across the five windings 31–35 with 2.4 volts appearing across each winding. As only 4.8 volts appear across each of diodes 37 and 38, these diodes do not break down and therefore do not conduct current.

As the 5 and 11 volt PNPN diodes do not break down, the current from input 42 flows through windings 35, 34, 33, 32 and 31 in a downward direction through each winding, thus causing fluxes to be set in the upward direction in windings 35, 33 and 31 and in a downward direction in windings 34 and 32. Ferreeds 2 and 3 remain unoperated, as the flux conditions in each of these ferreeds is now that shown in FIG. 1B. Although the flux conditions were originally that of FIG. 1C, a change of flux direction in each winding has no effect on the ferreed operation as is seen from FIG. 1B.

However, ferreed 1 does operate. Only the flux in winding 31 changes direction. Current flowing from input 42 does not flow through winding 30 as diode 36 shorts this winding and conducts current directly from winding 31 to ground. The flux condition in ferreed 1 therefore is that shown in FIG. 1A. The ferreed thus operates and the reeds close.

To reset the detector, again contacts 39 and 40 are moved to the right. Before a new input is applied they are once again moved to the left in preparation for the new input. If a 15 volt input is now applied the initial voltage across each of the six ferreed windings is 2.5 volts. As before, diode 36 breaks down, its breakdown voltage being exceeded by 1 volt. The 15 volt input now appears across the remaining five windings with 3 volts across each winding. As 6 volts now appear across windings 31 and 32 in series, diode 37 breaks down, its breakdown voltage being exceeded by 1 volt. Thus the 15 volt input appears only across windings 33–35, 5 volts appearing across each one. Diode 38 does not break down as only 10 volts appears across it.

With the 1.5 and 5 volt diodes conducting, no current flows through windings 32, 31 and 30. The flux in ferreed 1 remains in the reset condition (FIG. 1C) and the ferreed remains unoperated. The flux in each winding of ferreed 3 changes direction and, as when a 12 volt input is applied, ferreed 3, now having the flux condition of FIG. 1B, remains unoperated. As current flows through only winding 33 of ferreed 2, however, this ferreed operates, its flux condition being that shown in FIG. 1A.

In a similar manner the application of an 18 volt input causes all three PNPN diodes to break down. After diodes 36 and 37 break down, 6 volts appear across each of windings 33 and 34 and as a result the 11 volt PNPN diode conducts. The entire 18 volts thus appear across winding 35 which is the only winding having current flow through it. Ferreed 3 thus operates. Ferreeds 1 and 2 remain unoperated, there being no flux change in either of these ferreeds.

No current flows through winding 30 upon the application of any one of the three different inputs, and thus winding 30 is always shunted during the operation of the detector circuit. This winding may therefore be permanently shorted once the flux in the winding is initially set in the upward direction. The circuit is reset in the same manner with current flowing through the short circuit, now replacing diode 36, and windings 31 through 35. The short circuit also diverts current from winding 30 during the application of any of the three input voltages. This diode is omitted in the embodiment of FIG. 4 in which case it is also possible to not even connect the rightmost winding of ferreed 1 to the remainder of the circuit once it is initially pulsed in the direction shown. The inclusion of diode 36 and the connection of winding 30 to the circuit as in FIG. 3 is advantageous however in that if the flux in winding 30 is erroneously reversed it will be reset during the next reset operation.

Figure 4:
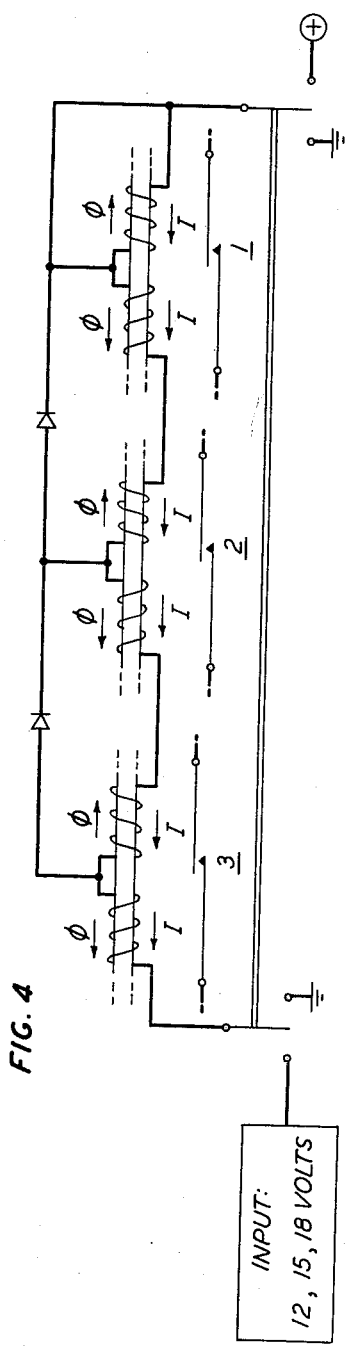

The embodiment of FIG. 4 is similar to that of FIG. 3, the only difference being that series ferreeds are incorporated rather than parallel ferreeds. Again, a series configuration is utilized with the PNPN diodes shunting windings analogous to those of FIG. 3. The circuit operation is similar to that previously described. Initially the circuit is reset with the current and flux directions being as shown in FIG. 4. Each ferreed stage is in the reset state of FIG. 2B. Again, the various inputs cause the diodes to break down as they do in FIG. 3. A ferreed whose windings are connected to two diodes, both in the breakdown condition, has no flux change responsive to the input voltage and remains unoperated. A ferreed, neither of whose windings is connected to a conducting diode, has a flux change in each winding and remains unoperated, the flux condition now being that shown in FIG. 2C. Only that ferreed whose windings are connected to only one diode in the breakdown condition operates as there is a change in the direction of flux in only one winding, the total flux condition now being that shown in FIG. 2A.

It is thus seen that an improved voltage level detector responsive to pulses of microsecond durations and of minimum complexity is achieved. A ferreed with but two windings can be utilized as the registering device in each stage, and the windings of all the ferreeds may be in a series circuit rather than a parallel one. It should be noted that stages may be added indefinitely, each stage requiring only an additional two-winding ferreed and a PNPN diode. The breakdown voltages of the various PNPN diodes are easily determined in accordance with the principles of the invention. A highly efficient voltage level detector of the utmost simplicity is achieved.

Although the invention has been described with a certain degree of particularity it is to be understood that the above-described arrangements are illustrative of the application of the principles of the invention. Numerous other arrangements may be devised by those skilled in the art without departing from the spirit and scope of the invention.

What is claimed is:

1. A voltage level detector comprising a plurality of ferreeds each having first and second windings connected in series, means for connecting the first windings of said ferreeds to the second windings of adjacent ferreeds, a plurality of voltage breakdown means each having a different breakdown voltage each connected across a different pair of first and second windings of different ferreeds, and means for applying an input voltage signal across all of said serially connected windings to operate only one of said ferreeds.

2. A voltage level detector comprising a plurality of ferreeds, each of said ferreeds having first and second windings serially connected to each other and to the windings of all others of said ferreeds; voltage input means connected across said serially connected windings; and a plurality of current diverting means individually connected across said windings each for diverting current from one and only one winding of at most two of said ferreeds and all operative responsive to input voltages exceeding respective predetermined minimum values to cause only one of said ferreeds to operate responsive to respective input voltages.

3. A signal level detector comprising a plurality of ferreeds, each of said ferreeds having first and second windings serially connected to each other and to the windings of all others of said ferreeds; signal input means connected across said serially connected windings; and a plurality of current diverting means individually connected to said windings each for diverting current from one winding of two of said ferreeds and all operative responsive to different sets of signal inputs to cause only one of said ferreeds to operate responsive to respective input signals.

4. A signal level detector comprising a plurality of energizable devices each having first and second series circuits for operating said respective devices responsive to current flow through both of said series circuits in predetermined directions, means for serially connecting each of said first and second series circuits in all of said devices, reset means selectively connectable across all of said serially connected series circuits for causing current flow through said first and second series circuits of each of said devices in the same first direction to de-energize each of said devices, signal input means selectively connectable across all of said serially connected series circuits for normally causing current flow through said first and second series circuits of each of said devices in the same second direction, and current diverting means individually connected to said series circuits for diverting current from only one series circuit in only one of said devices to operate said devices responsive to respective input signals.

5. A voltage level detector comprising a plurality of ferreeds each having first and second windings, voltage input means for applying voltage pulses having any one of a plurality of predetermined magnitudes to cause the same current to normally flow through both windings of each of said ferreeds, means individually connected to the windings of pairs of said ferreeds for inhibiting current flow through one winding of both ferreeds in each of said pairs to control current flow through only one winding of only one of said ferreeds responsive to respective input voltage magnitudes, and means for de-energizing all of said ferreeds prior to the operation of said voltage input means.

6. A voltage level detector comprising $n$ ferreeds each having first and second windings; means for serially connecting all windings of all of said ferreeds; input voltage means connected across said serially connected windings for applying a potential across said serially connected windings, said potential having any one of $n$ distinct magnitudes; and means for operating only the $j$th ferreed responsive to the application of a potential having the $j$th magnitude where $n>j$, said means including a plurality of PNPN diodes each connected across two serially connected windings on different ferreeds, each of said PNPN diodes having a breakdown potential whose magnitude is greater than the magnitude of the breakdown potential of the PNPN diode preceding it and less than the magnitude of the breakdown potential of the PNPN diode succeeding it, said diodes having predetermined breakdown potentials for controlling an input voltage of the $j$th magnitude, where $j>1$, to break down the first $j-1$ PNPN diodes to divert current from both windings of the first $j-1$ ferreeds and to divert no current from the windings of all ferreeds above and including the $(j+1)$th for preventing said ferreeds from operating, and to divert current from only one winding of the $j$th ferreed for causing said ferreed to operate.

References Cited in the file of this patent

UNITED STATES PATENTS

| | | |
|---|---|---|
| 2,566,426 | Parks | Sept. 4, 1951 |
| 2,706,257 | Salati | Apr. 12, 1955 |
| 2,948,843 | Klein | Aug. 9, 1960 |
| 2,976,520 | Reenstra | Mar. 21, 1961 |
| 3,034,038 | Snygg | May 8, 1962 |